July 1, 1969  H. A. ECKHARDT  3,452,864
APPARATUS FOR CONVEYING PARTICULATE MATERIALS
Filed Nov. 16, 1967  Sheet 1 of 3

INVENTOR.
HANS A. ECKHARDT

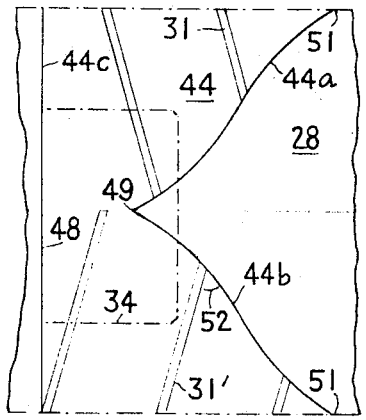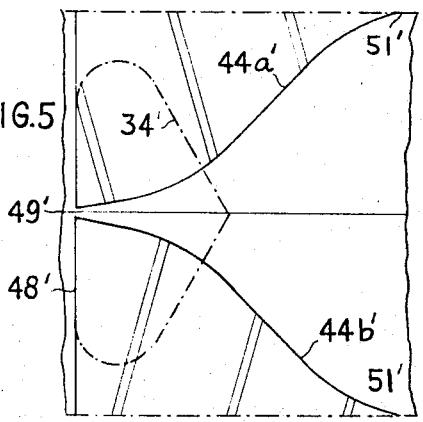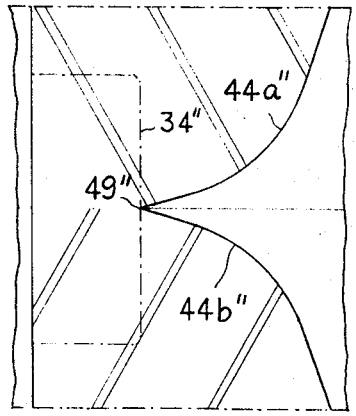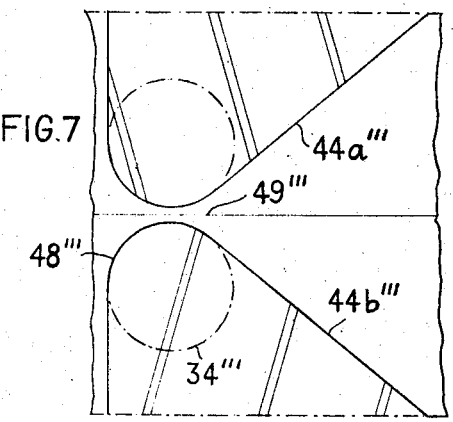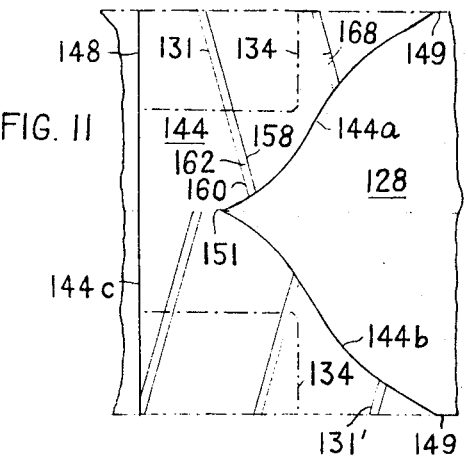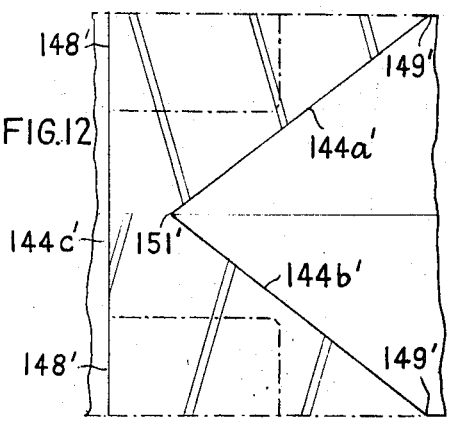

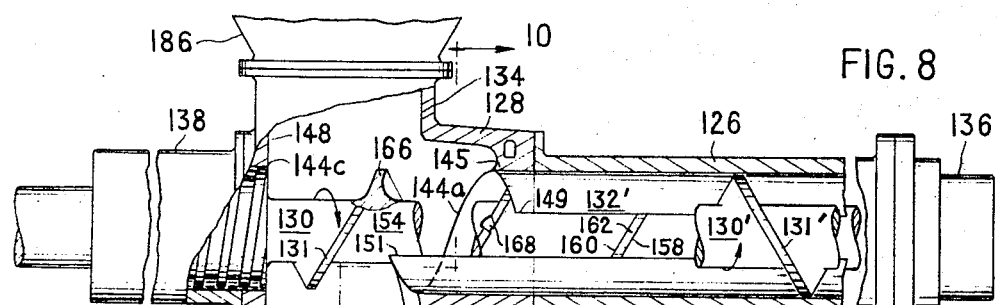
FIG. 8
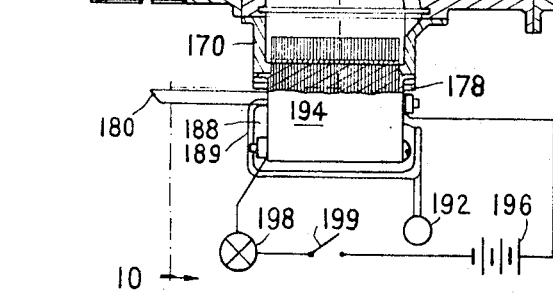
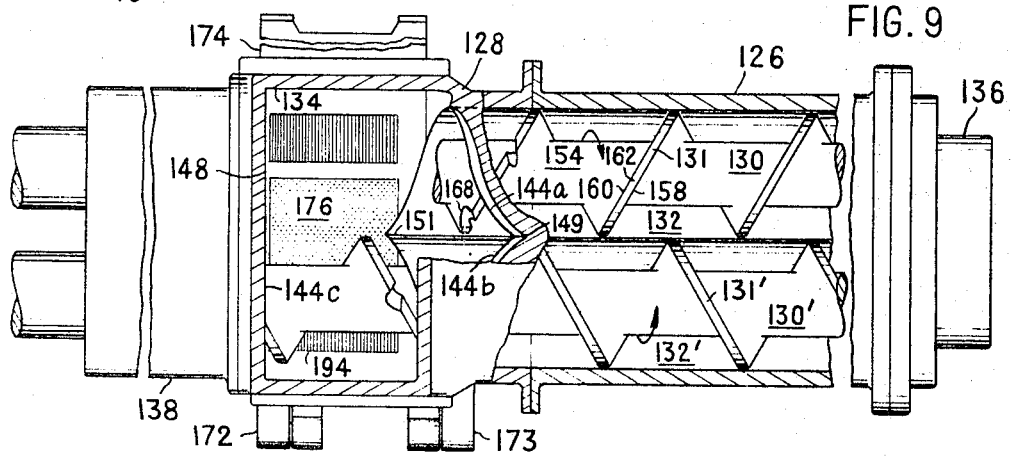
FIG. 9
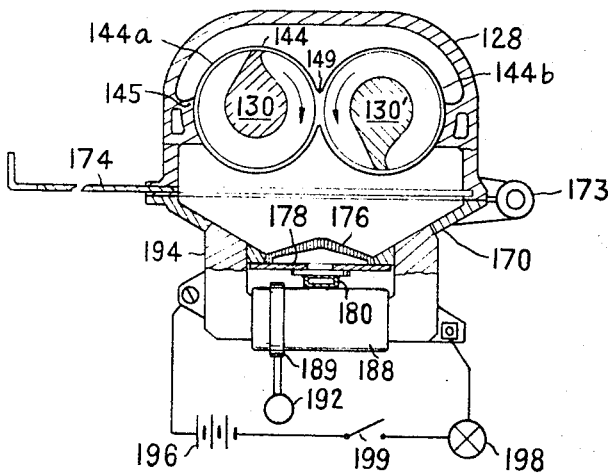
FIG. 10
INVENTOR.
HANS A. ECKHARDT

United States Patent Office 3,452,864
Patented July 1, 1969

3,452,864
APPARATUS FOR CONVEYING PARTICULATE
MATERIALS
Hans A. Eckhardt, 55 Crescent Bend,
Allendale, N.J. 07401
Filed Nov. 16, 1967, Ser. No. 683,740
Int. Cl. B03c 1/30
U.S. Cl. 209—39                                   19 Claims

ABSTRACT OF THE DISCLOSURE

This invention relates to the problem of feeding hard, tough particles in a twin-screw conveyor and with the problem of removing tramp metal therein. The feed material enters the screw bore through a specific butterfly-shaped opening defined by an edge along which that bore is enlarged in essentially radial direction, and the tramp metal moves to an underlying, hinged accumulating space wherein gas may be introduced and magnetic separation or detection means may be located.

---

The present invention relates to an apparatus for conveying particulate materials, and more particularly to a twin-screw conveyor for feeding hard, tough particles and for removing foreign particles from the feed material.

Screw conveyors are used in many industries for conveying particulate materials to and from apparatus for mixing, dispersing, homogenizing, kneading, compressing, devolatilizing, drying, separating, extruding or otherwse treating such materials. Frequently the conveying operation is combined in a twin-screw conveyor with one or more of the aforementioned material treatments, such as is customary in twin-screw extruders, blow molding machines, injection molding machines for plastic materials, especially for polymeric compositions. Nevertheless these machines constitute in their upstream portion twin-screw conveyors, and since the subject of this disclosure does not deal with material processing in machine portions further downstream, the term twin-screw conveyor is applied herein for the abovementioned and other machine types which constitute in their upstream portions of twin-screw conveyor or a twin-screw feeder.

Conventionally a twin-screw conveyor has a housing with a hopper section, twin screws mounted rotatably in and extending through two laterally intersecting bores of this housing conforming to the twin screws, and in that hopper section a hopper throat of round, square or rectangular cross-section which intersects with these bores. Usually the hopper throat is symmetric to the vertical plane through the intersections of these bores. Frequently all the walls of the hopper throat are vertical, and while with rectangular or square hopper throat cross-sections the downstream and upstream endwalls of the hopper throat approach the bores in radial planes, the right and left sides approach the bores either tangentially or intersecting under an angle which is usually only slightly less than 180°. In case of round or oblong hopper throats, a gradual transition from the 90° intersection with the generatrix of the bores atop the bore intersection to the tangential or close to tangential approach at the left and right sidewalls takes place. In other constructions where the sidewalls of the hopper throat at the right and left sides converge downward and approach the bores either tangentially or, above that line, at an angle slightly less than 180°, principally the same conditions exist.

Sometimes the tangential approach is carried further by undercutting at least one bore so that the material is carried around the screw in a gradually decreasing wedge-shaped groove finally blending with the bore. Sometimes this wedge-shaped groove is extended to the opposite side of the bore until the lower bore intersects. In any case the downstream and upstream walls of this undercut groove form with the bores an edge with an angle between 90° and 180°.

The aforesaid hopper throats had been developed primarily for powdery and other granular materials and especially the under-cut types for rubber polyvinyl chloride and other plastics compositions which originally were fed to screw machines in the form of cold or hot soft strips. With the advent of later polymers such as the polyamides, the polyethylenes, especially of higher molecular weight, the polyacetals, the polycarbonates and many others, which have been commercially available as hard, tough pellets of about ⅛ inch size, severe problems were encountered when processing them on screw machines with such hopper throats.

On the hopper throats described, above, the downstream endwall and the screw bores form an edge which is approached at a relatively narrow angle by the leading edge of the screw flight passing underneath. The hard, tough pellets of the feed material are constantly getting in the wedge-shaped area between these two edges, and during the operation of the screw conveyor they are wedged between these two edges. Since each of these two edges includes an angle of 90° or wider, the pellets are not forced out of the wedge-shaped space. As a result either the screw jams thus interrupting the operation of the screw conveyor, or the hard tough pellets break off larger or smaller pieces from the screw flights and from the hopper section contaminating the production, often rendering the processed product unusable, disordering and even damaging subsequent equipment such as extrusion dies, molds, valves, spinnerettes, calender rolls.

On twin-screw conveyors with the screws turning downward on their adjacent sides, the heaviest abrasion occurs at the downstream endwall near the upper intersection where the screw flights rotate inward and downward and where the weight of the material particles and that of the material above them hinders them to escape the wedging action. If the hopper throat has a straight downstream endwall in a radial plane of the twin screws, the pellets are wedged and crushed severely over the entire width of that downstream endwall, again their weight and that of the material above supporting the hazard.

In one such design a relatively narrow, vertical rib divides the hopper throat length-wise, and extends downward toward the horizontal generatrix common to both bores. Thereby a further hazard is created by wedging the feed material between the screw flights rotating downward and each side of that vertical rib.

This latter additional wedging action causes also damage on those twin-screw conveyors which have the twin screws rotating upward at their adjacent sides and rotating downward at their outer sides where the screw flights form wedges with the right and with the left sidewalls of the hopper throat. This applies without exception to those hopper throats where the right and left sidewalls approach the screw bores tangentially, with a wide-angle edge, or undercut.

It is known that even if no hard or tough pellets, granules or chips which for simplicity are referred to in this description as pellets, are to be processed and the material consists of smaller particles of lower hardness or toughness, metal particles are abraded and eroded out of the screw flights and the entrance of bores. Such small metal particles cause a highly undesirable color development in transparent polymeric materials while on opaque compositions they cause a deviation from the required color shade that has to be matched. While the amount of abraded metal could be decreased by using special, expensive alloys with increased abrasion resistance, an elimination of the above mentioned hazards has not been achieved even with the most suitable construction materials.

Even those twin-screw conveyors which are used for processing bulk materials of small particle size and low hardness and toughness, are exposed to jamming, when foreign hard tough particles such as nuts, bolts, or other metallic or non-metallic particles get accidently into the hopper and are squeezed in the above described wedge-shaped spaces between screw flights and hopper throat walls. In case the screw succeeds in crushing such foreign particles, severe damage to the screw flights and the hopper throat and also on machine parts further downstream occurs, mostly connected with unacceptable contamination of the product.

Many attempts have been made to resolve these problems but none of them had decisive success. One method suggested is to bevel or round the edge along the intersection of hopper throat and bore; however the wedging hazards were not eliminated, but in most cases even increased. Another method proposed a larger clearance between the screw flight lands and the bore diameter. This proposal still leads to jamming and damage since in most cases a clearance larger than the largest material or foreign particle is impractical, and a somewhat smaller clearance did not eliminate the described dangers, but creates even additional wedging hazards downstream of the hopper throat.

In other attempts recesses and openings in the bore located further downstream of the downstream hopper throat wall are provided; for obvious reasons they could not eliminate or even decrease the described hazards which occur at the downstream endwall and the sidewalls of the hopper throat. Furthermore they were concerned with tramp metal only and could not be expected to eliminate the hazards caused by the hard, tough particles of the feed material. Besides, such recesses are using up additional expensive machine length which is lost for compression or other process treatment purposes.

To remove foreign particles, such as tramp metal, from the feed material, it has been proposed to sift the feed material through a screen or perforated plate before it enters the hopper throat. This method is applicable only for well-flowing materials, but not for sticky, tacky materials. Furthermore only such foreign particles can be screened out which are larger than the largest particle expected in the feed material. The hazards caused by the hard, tough pellets of the feed material are not even decreased.

Another method suggests the use of a grate magnet above the feed throat. However, the chemical and other industries use to a great extent stainless steels, aluminum and other non-magnetic metals in their plants. Such bolts, nuts, etc. from upstream equipment are not retained by the grate magnet. Furthermore, with many materials magnetized bars obstruct the flow of material excessively and therefore cannot be used.

Accordingly, it is an object of this invention to provide a new and improved twin-screw conveyor which eliminates the jamming of tough hard material particles and overcomes the foregoing and other difficulties of prior art practices.

A further object of the invention is to provide a new and improved twin-screw conveyor for automatically removing tramp metal and other foreign particles.

Generally speaking, the present invention contemplates an improvement in an apparatus for conveying particulate materials having a housing with a hopper section, adjacent twin screws with screw flights mounted rotatably in and extending through two laterally intersecting bores in said housing, the bore surface conforming to the peripheral shapes of said screws, and a hopper port in the hopper section. According to the inventive concept there is provided a butterfly-shaped symmetrical opening in the bore surface within the hopper section, open to the hopper port, limited in the upstream direction by a rear edge following the upstream sidewall of the hopper port, limited in the downstream direction by a front edge starting at the upper intersection of the bores, and spiraling around each of the two screws with a twist contrary to the screw flights, to the lower interesection of the bores; there is provided an enlargement of the bores over the area of the butterfly-shaped opening within the hopper section in radial direction by an increment larger than the size of the largest particle to be processed; the butterfly-shaped symmetrical opening is defined by a front and rear edge including an angle of less than 90° over at least part of their length.

These and other objects and features of the invention will become apparent by reference to the following detailed specification and drawings wherein.

Figure 1:
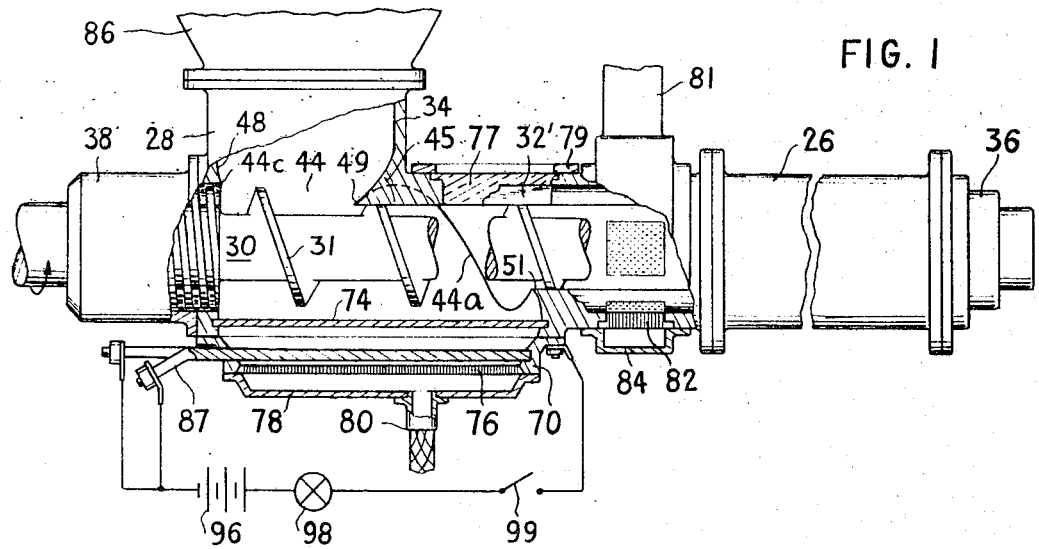
FIGURE 1 is an elevation, partly in section, showing one embodiment of the invention.
Figure 2:
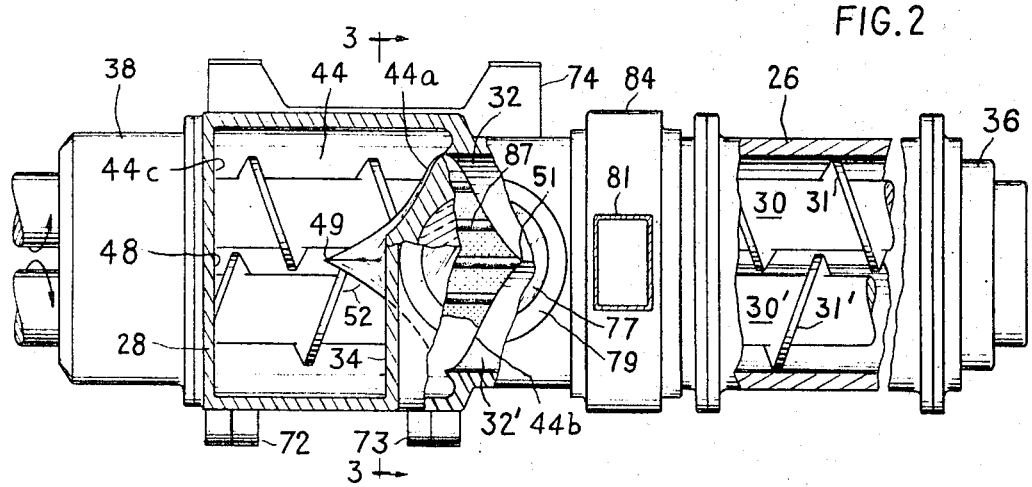
FIGURE 2 shows a plan view, partly sectional, of the embodiment of FIGURE 1.
Figure 3:
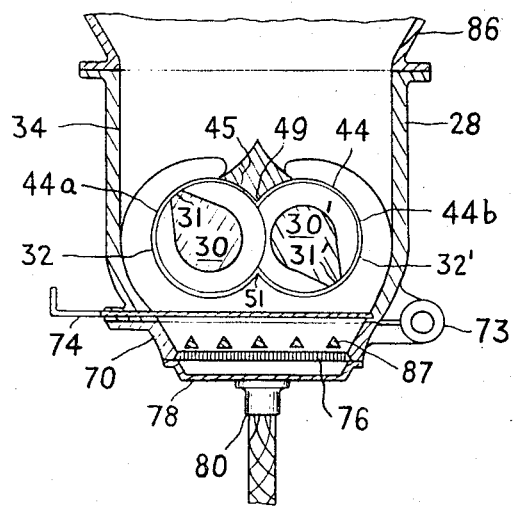
FIGURE 3 is a cross-sectional view along the lines 3—3 of FIGURE 2.

FIGURE 4 presents a plane development of the embodiment of FIGURE 1;

FIGURE 5 is a plane development of another embodiment;

FIGURE 6 shows a plane development of still another embodiment;

FIGURE 7 is a plane development of a further embodiment;

FIGURE 8 presents an elevation, partly in section, of another embodiment of the invention;

FIGURE 9 is a plan view, partly sectional, of the embodiment of FIGURE 8;

FIGURE 10 illustrates a cross-sectional view taken along the lines 10—10 of FIGURE 8;

FIGURE 11 is a plane development of the embodiment of FIGURE 8;

FIGURE 12 is a plane development of another embodiment.

Referring now to the drawings, FIGURES 1, 2, 3, 4, there is shown an apparatus for conveying particulate materials having a housing 26 with a hopper section 28, twin adjacent screws 30, 30' with screw flights 31, 31' mounted rotatably in and extending through two laterally intersecting bores 32, 32' in the housing 26. The surfaces of the bores 32, 32' conform to the peripheral shapes of the screws 30, 30'. There is a hopper port 34 in the hopper section 28. To the downstream end of the housing 26 is flanged the extrusion die 36, while to the upstream end of the housing 26 is connected the rear housing 38. The housings 26 and 38 rest on the frame of the apparatus and the screws 30, 30' are rotated in opposite directions by suitable driving means (not shown).

The butterfly-shaped symmetrical opening 44 in the surface of the bores 32, 32' within the hopper section 28, open to the hopper port 34, is limited in the upstream direction by a rear edge 44c following the upstream sidewall 48 of the hopper port 34 and is limited in the downstream direction by a front edge 44a, b starting at the upper intersection 49 of the bores 32, 32' and spiraling around each of the two screws 30, 30' with a twist contrary to the screw flights 31, 31' to the lower intersection 51 of the bores 32, 32'.

The bores 32, 32' are enlarged over the area of the butterfly-shaped opening 44 within the hopper section 28 in generally radial direction by an increment larger than the size of the largest particle to be processed. The front edge 44a, b and the rear edge 44c include an angle 45 of less than 90° over at least part of their length.

As shown in the embodiment of FIGURES 1, 2, 3, 4, the front edge 44a, b starts from the upper intersection 49 where it approaches the upstream sidewall 48 of the hopper port 34 and spirals around each of the two screws 30, 30' in a direction between the direction of screw rotation and the downstream direction, to the lower intersection 51 of the bores 32, 32'.

The front edge 44a, b forms with each screw flight 31, 31' an angle 52 which has its maximum above the axes of the screws 30, 30' and decreases along its downward spiral.

The lower portion 70 of the hopper section 28 is recessed so as to form an accumulating space for processed particles, and is mounted by a hinged connection 72, 73 for quick detachment and fast removal of processed particles. Above the hinged lower portion 70 of the hopper section 28 there is provided a movable partition 74 which permits in its closed position the fast removal of processed particles without interrupting the material conveyance.

The hopper section 28 is provided with means for introducing gases into the material conveyed therein consisting of the porous plate 76 and the cover 78. Air or other gases, either cold or heated, are introduced through the duct 80; they seep through the porous plate 76 and between the material particles either to withdrawal means at the hopper 86, or to means for withdrawing gases from the conveyed material provided in the housing 26 and more specifically in the hopper section 28 thereof. These means comprise the porous insert 82 and the cover 84; the space therebetween is either open to atmosphere or connected to a negative pressure pump (not shown) by the duct 81.

The introduced air or other gases serves to improve the flow properties of the material, to fluidize the material, to increase the mobility of the material particles, to improve the gravity separation of heavier foreign particles, to heat, dry, cool or otherwise treat the material. These operations are essentially improved when compared with conventional equipment, where hot air is introduced above the hopper section 28 in the lower part of the hopper 86, and withdrawn at the upper part of the hopper 86. The gas withdrawal downstream of the lower portion 70 improves the filling of the screws 30, 30' and permits to control the bulk density of the material and the uniformity thereof.

The hopper section 28 is provided with a transparent cover 77 held by a flange 79 to observe the flow of material.

Electrically conductive members 87 extend across the lower portion 70 of the hopper section 28 from which their ends mounted therein are electrically insulated. The members 87 are connected to one pole of an electric energy source 96, the other pole of which is connected to the hopper section 28 via a switch 99 and current indicating means 98 which signal the presence of electrically conductive particles bridging the space between any of the members 87 and the porous metal plate 76 forming the bottom of the hopper section 28. Should the porous plate 76 for any reason not be of metal or other conductive material, then the even numbers of the members 87 would be connected with the lower portion 70 to one pole of the electric energy source 96, the other pole of which would be connected to the odd numbers of the members 87 via the switch 99 and current indicating means 98 which then signal the presence of electrically conductive particles bridging the distance between any of the odd and any of the even numbered members 87 and the lower portion 70.

It is to be understood that the members 87 may be inserted in and insulated from the porous metal plate 76. Should the porous plate 76 be nonmetallic, non-conductive, then the even numbers of the inserted members 87 would be electrically connected with the hopper section 28 to one pole of the electric energy source 96, the other pole of which would be connected to the odd numbers of the members 87 via the switch 99 and current indicating means 98 which then signal the presence of electrically conductive particles bridging the distance between any of the odd and any of the even numbered members 87 and the lower portion 70.

FIGURE 5 is a plane development of another embodiment, again cut along the lower intersection 51' showing the triangular hopper port 34' in vertical projection. The front edge 44a', b' starts at the upper intersection 49' where it meets the upstream sidewall 48'.

FIGURE 6 shows the projection of a rectangular hopper port 34". Where the projection of its downstream sidewall meets the upper intersection 49", is the upstream start point of the front edge 44a", b".

FIGURE 7 shows the front edge 44a''', b''' as starting at the upper intersection 49''' where it meets the upstream sidewall 48'''. The hopper port 34''' has a round vertical projection.

FIGURES 8, 9, 10 show an apparatus for conveying particulate materials having a housing 126 with a hopper section 128, twin adjacent screws 130, 130' with screw flights 131, 131' mounted rotatably in and extending through two laterally intersecting bores 132, 132' in the housing 126. The surface of the bores 132, 132' conforms to the peripheral shapes of the screws 130, 130'. There is a hopper port 134 in the hopper section 128. To the downstream end of the housing 126 is flanged the discharge orifice 136, while to the upstream end of housing 126 is flanged the rear housing 138. The screws 130, 130' are rotated in opposite directions by suitable driving means (not shown).

A butterfly-shaped symmetrical opening 144 in the surface of the bores 132, 132' within the hopper section 128, open to the hopper port 134, is limited in the upstream direction by a rear edge 144c following the upstream sidewall 148 of the hopper port 134, and is limited in the downstream direction by a front edge 144a, b starting at the upper intersection 149 of the bores 132, 132' and spiraling around each of the two screws 130, 130' with a twist contrary to the screw flights 131, 131' to the lower intersection 151 of the bores 132, 132'.

The bores 132, 132' are enlarged over the area of the butterfly-shaped opening 144 within the hopper section 128 in generally radial direction by an increment larger than the size of the largest particle to be processed. The front edge 144a, b and the rear edge 144c include an angle 145 of less than 90° over at least part of their length.

The front edge 144a, b starts at the upper intersection 149 and spirals around each of the two screws 130, 130' in a direction between the upstream direction and the direction opposite to the screw rotation, to the lower intersection 151 approaching the upstream sidewall 148.

Each screw 130, 130' comprises a root 154 and a helical flight 131 which includes a leading edge 158, a trailing edge 160 and a land 162 therebetween. The angle 166 between the surface of the leading edge 158 and the surface of the land 162 is less than 90° along the helical screw flight 156 between the upstream sidewall 148 and the upper intersection 149 being that point of the front edge 144a, b which is located furthest downstream.

The helical flight 131 is provided with a groove 168 between the trailing edge 160 and the leading edge 158 such that the opening in the trailing edge 160 is larger than the opening in the leading edge 158. The groove 168 is preferably located in the same radial plane as that bore intersection which is located furthest downstream, namely the upper intersection 149 in the FIGURES 8, 9, in contrast to the lower intersection 51 in FIGURES 1, 2. A larger number of grooves 168 may be provided, generally between the upper intersection 149 and the lower intersection 151. When either the screws 130, 130' or the housing 126 are axially movable, as in case of reciprocating or oscillating screw machines, grooves 168 further upstream and further downstream are advantageous.

The decrease in conveying efficiency of the screws 130, 130' can be compensated by providing a correspondingly larger pitch, or a larger flight depth, or both, of the screws 130, 130'.

The lower portion 170 of the hopper section 128 is recessed and is mounted by a hinged connection 172, 173. Above the lower portion 170 there is provided a movable partition 174.

The hopper section 128 is provided with means for introducing air or other gases consisting of the porous plate 176, the cover 178 and the duct 180. The gas is either conveyed with the material to the discharge orifice 136, if desirable, or is withdrawn through the hopper 186 by means not shown.

The hopper section 128 is provided with magnetic means to pull and retain magnetic particles in the hopper section 128 which include a primary winding 188 which induces into a secondary winding 189 a voltage changed by foreign particles changing the magnetic field, the change in voltage being used by voltage measuring means 192 for indicating and signaling the accumulation of such foreign particles. It is an essential fact that the magnetic field and as a result the induced voltage are increased in intensity by magnetic foreign particles, but decreased and altered in its phase characteristics by nonmagnetic metal bodies into which eddy currents are induced. Therefore, an indication of the nature of the foreign particles is possible.

The voltage measuring means 192 are shown only schematically and it is understood that any suitable arrangement utilizing the change in the induced voltage for indicating and signaling the presence of foreign particles may be used. For example, the voltage measuring means 192 may include a reference or comparison unit (not shown) comprising a primary winding identical to and in series with the primary winding 188, a secondary winding identical to and in opposed series with the secondary winding 189 and a laminated core identical to the laminated core 194. If before the start-up of the operation the voltage in the secondary circuit is adjusted to zero, during the operation foreign particles accumulating at the bottom of the hopper section 128 will cause the loss of equilibrium in this secondary circuit and the induced differential voltage is then used for indicating and signaling the accumulation of such foreign particles.

The magnetic means include a laminated core 194 which forms part of the surface of the lower portion 170 of the hopper section 128 being in contact with the conveyed material, and which has the even numbers of insulated metal layers electrically connected with each other, with the hopper section 128 and with one pole of an electric energy source 196, the other pole of which is connected with the odd numbers of insulated metal layers via a switch 199 and current indicating means 198 which signal the presence of electrically conductive particles bridging the space between any odd and any even numbered insulated metal layers and the hopper section 128.

While the aforementioned electrical connections are preferred, the odd numbers of insulated metal layers of the laminated core 194 may be connected with the hopper section 128, instead of the even numbers, without departing from the scope of this disclosure.

It is to be understood that the hopper section 128 may carry one part, and one or more of the screws 130, 130' another part of sensing means selected from those based on principles of magnetism, electricity and radiation to detect foreign particles in the hopper section 128.

In the various embodiments, several surfaces are shown as sealing against gases as well as against the feed material. The seals, however, are not shown for better clarity. Also not shown, for the same reason, are bolts, screws and nuts to connect parts shown as being provided with flanges for such connections.

In the illustrated embodiments, screw conveyors with one or two parallel continuous screws are described, while it is understood that the same principle can be applied to conveyors with more than two screws, and to conveyors with interrupted flight screws or paddle rotors. It is further understood that the bore and screw axes are not necessarily horizontal, as shown in the various embodiments, but may be inclined from the horizontal plane. While the embodiments show two screws side-by-side parallel, it is understood that one screw may be disposed above another screw, or disposed in relation to the next adjacent screw under any angle. It is further understood that one or more screws may have a conical peripheral surface instead of the cylindrical peripheral surfaces shown in the various embodiments. It is understood that this disclosure also applies to screw machines with either the screws or the housing axially movable, in either a reciprocating or an oscillating movement.

What is claimed is:

1. An apparatus for conveying particulate materials having a housing with a hopper section, twin adjacent screws with screw flights mounted rotatably in and extending through two laterally intersecting bores in said housing, the bore surface conforming to the peripheral shapes of said screws, a hopper port in said hopper section, the improvement therein comprising:
    (a) a butterfly-shaped symmetrical opening in said bore surface within the hopper section, open to said hopper port, limited in the upstream direction by a rear edge following the upstream sidewall of said hopper port, limited in the downstream direction by a front edge starting at the upper intersection of said bores, and spiraling around each of the two screws with a twist contrary to the screw flights, to the lower intersection of said bores,
    (b) an enlargement of said bores over the area of said butterfly-shaped opening within the hopper section in radial direction by an increment larger than the size of the largest particle to be processed,
    (c) said front and rear edges including an angle of less than 90° over at least part of their length.

2. An apparatus for conveying particulate materials according to claim 1 wherein the front edge starts from the upper intersection where it approaches the upstream sidewall of said hopper port, and spirals around each of the two screws in a direction between the direction of screw rotation and the downstream direction, to the lower intersection of said bores.

3. An apparatus for conveying particulate materials according to claim 1 wherein the front edge starting at the upper intersection spirals around each of the two screws in a direction between the upstream direction and the direction opposite to the screw rotation, to the lower intersection approaching the upstream sidewall.

4. An apparatus for conveying particulate materials according to claim 1 wherein the front edge forms with each screw flight an angle having its maximum above the axes of the screws and decreasing along its downward spiral.

5. An apparatus for conveying particulate materials according to claim 1 wherein each screw comprises:
    a root;
    a helical flight on said root;
    the helical flight comprising a leading edge, a trailing edge and a land therebetween;
    the angle between the leading edge surface and the land surface being less than 90° along the screw flight between the upstream sidewall and that point of the front edge which is located furthest downstream.

6. An apparatus for conveying particulate materials according to claim 1 wherein the screw comprises:
    a root;
    a helical flight on said root;
    the helical flight comprising a leading edge, a trailing edge and a land therebetween;
    the helical flight being provided with a groove between the trailing edge and the leading edge such that the opening in the trailing edge is larger than the opening in the leading edge.

7. An apparatus for conveying particulate materials according to claim 1 wherein the lower portion of the hopper section is recessed so as to form an accumulating space for processesd particles.

8. An apparatus for conveying particulate materials according to claim 1 wherein the hopper section's lower portion is mounted by a hinged connection for quick detachment and fast removal of processed particles.

9. An apparatus for conveying particulate materials according to claim 8 wherein a moveable partition is provided above the hinged lower portion of said hopper section, said moveable partition permitting in its closed position the fast removal of processed particles without interrupting the material conveyance.

10. An apparatus for conveying particulate materials according to claim 1 wherein said hopper section is provided with means for introducing gasses into the material conveyed therein.

11. An apparatus for conveying particulate materials according to claim 1 wherein said housing with said hopper section is provided with means for withdrawing gasses from the material conveyed therein.

12. An apparatus for conveying particulate materials according to claim 1 wherein said housing with said hopper section is provided with a transparent cover so as to observe the flow of material.

13. An apparatus for conveying particulate materials according to claim 1 wherein said hopper section is provided with magnetic means to pull and retain magnetic particles in said hopper section.

14. An apparatus for conveying particulate materials according to claim 13 wherein the magnetic means include a primary winding which induces into a secondary winding a voltage changed by foreign particles changing the magnetic field, the change in voltage being used for indicating and signalling the presence of such foreign particles.

15. An apparatus for conveying particulate materials according to claim 13 wherein the magnetic means include a laminated core which forms part of the surface of said hopper section being in contact with the conveyed materals, the laminated core having the even numbers of insulated metal layers electrically connected with each other, with the hopper section, and with one pole of an electric energy source, the other pole of which being connected with the odd numbers of said insulated metal layers via current indicating means to signal the presence of electrically conductive particles bridging the space between any odd and any even numbers of insulated metal layers and the hopper section.

16. An apparatus for conveying particulate materials according to claim 1 wherein electrically conductive members extend across the lower portion of said hopper section insulated therefrom, said members being connected to one pole of an electric energy source, the other pole of which being connected to said hopper section via current indicating means which signal the presence of electrically conductive particles bridging the space between any of said members and the bottom of said hopper section.

17. An apparatus for conveying particulate materials according to claim 1 wherein the hopper section carries one part, and a screw another part of sensing means selected from those based on principles of magnetism, electricity and radiation, to detect foreign particles in the hopper section.

18. An apparatus for conveying particulate materials having a housing with a hopper section, a screw mounted rotatably in and extending through the bore of said housing, a hopper port in said hopper section, the improvement therein comprising:

a lower portion of said hopper section being recessed so as to form an accumulating space for processed material; said lower portion being mounted by a hinged connection to said hopper section for quick detachment;

a moveable partition provided above said lower portion, permitting in its closed position the detachment of said lower portion without interrupting the material conveyance;

electrically conductive members inserted in said lower portion and insulated therefrom, electrically connected to one pole of an electric energy source, the other pole of which is connected to said lower portion via current indicating means which signal the presence of electrically conductive particles bridging the distance between said members and said lower portion.

19. A screw conveyor having a housing with a hopper section, a screw mounted rotatably in and extending through the bore of said housing, a hopper port in said hopper section, the improvement therein comprising:

a lower portion of said hopper section being recessed so as to form an accumulating space for processed material; said lower portion being mounted by a hinged connection to said hopper section for quick detachment;

a moveable partition provided above said lower portion, permitting in its closed position the detachment of said lower portion without interrupting the material conveyance;

magnet means to pull and retain magnetic particles in the hopper section comprising a primary winding which induces into a secondary winding a voltage changed by foreign particles changing the magnetic field, the change in voltage being used for indicating and signalling the presence of such foreign particles;

said magnetic means comprising a laminated core which forms part of the surface of said hopper section being in contact with the conveyed material, the laminated core having the even numbers of insulated metal layers electrically connected with each other, with the hopper section and with one pole of an electric energy source, the other pole of which being connected with the odd numbers of said insulated metal layers via current indicating means to signal the presence of electrically conductive particles bridging the space between any odd and any even numbers of insulated metal layers and the hopper section.

References Cited

UNITED STATES PATENTS

| | | | |
|---|---|---|---|
| 2,186,404 | 1/1940 | Carter | 302—50 X |
| 2,290,930 | 7/1942 | Wurzbach | 324—41 |
| 2,455,750 | 12/1948 | Freed | 198—64 |
| 2,951,693 | 9/1960 | Carothers | 198—213 X |

FOREIGN PATENTS 160,499  1/1955  Australia.

TIM R. MILES, *Primary Examiner.*

U.S. Cl. X.R.

18—12; 25—14; 209—138, 147, 223, 225; 222—195, 413; 302—50; 324—41